(12) United States Patent
Kloepfer

(10) Patent No.: US 9,797,515 B2
(45) Date of Patent: Oct. 24, 2017

(54) RADIALLY COACTING RING SEAL

(71) Applicant: UNITED TECHNOLOGIES CORPORATION, Farmington, CT (US)

(72) Inventor: Richard J. Kloepfer, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/418,712

(22) PCT Filed: Mar. 15, 2013

(86) PCT No.: PCT/US2013/032605
§ 371 (c)(1),
(2) Date: Jan. 30, 2015

(87) PCT Pub. No.: WO2014/051700
PCT Pub. Date: Apr. 3, 2014

(65) Prior Publication Data
US 2015/0204447 A1 Jul. 23, 2015

Related U.S. Application Data

(60) Provisional application No. 61/707,514, filed on Sep. 28, 2012.

(51) Int. Cl.
*F16J 15/16* (2006.01)
*F16J 15/34* (2006.01)
(Continued)

(52) U.S. Cl.
CPC .......... *F16J 15/3464* (2013.01); *F01D 9/041* (2013.01); *F01D 11/003* (2013.01);
(Continued)

(58) Field of Classification Search
CPC .. F16J 15/3464; F16J 15/3468; F16J 15/3472; F16J 15/348; F16J 15/3488; F01D 11/003
See application file for complete search history.

(56) References Cited

U.S. PATENT DOCUMENTS 1,586,575 A * 6/1926 Panyard ..................... F16J 9/12
277/446
3,963,389 A 6/1976 Miller
(Continued)

FOREIGN PATENT DOCUMENTS

EP 0361056 A1 4/1990
JP 55-036618 A 3/1980

OTHER PUBLICATIONS

EP SR; EP Appl. No. 13842850.3 (2901000), dated Jun. 28, 2016, 7 pages.

*Primary Examiner* — Gilbert Lee
(74) *Attorney, Agent, or Firm* — Cantor Colburn LLP

(57) ABSTRACT

A ring seal apparatus for high temperature sealing includes a first ring including a pair of radial faces and a second ring including a second pair of radial faces, the second ring adapted to coact with the first ring. The first and second rings together define a pair of coacting mating faces. The mating faces are obliquely angled relative to the radial faces, such that each of the coacting mating faces is adapted to seal an interface of the two rings at an angle relative to their substantially parallel radial faces. The pair of coacting rings is adapted to seal a circumferential gap between a pair of components.

20 Claims, 3 Drawing Sheets

(51) Int. Cl.
*F01D 9/04* (2006.01)
*F01D 11/00* (2006.01)
*F01D 25/24* (2006.01)

(52) U.S. Cl.
CPC .......... *F01D 11/005* (2013.01); *F01D 25/246* (2013.01); *F05D 2230/642* (2013.01); *F05D 2240/55* (2013.01); *F05D 2250/314* (2013.01)

(56) References Cited

U.S. PATENT DOCUMENTS

| | | | |
|---|---|---|---|
| 4,475,739 A | | 10/1984 | Nakajima et al. |
| 5,292,138 A | * | 3/1994 | Glynn .................... F16J 15/164 277/422 |
| 5,899,459 A | | 5/1999 | Watts |
| 6,705,616 B2 | * | 3/2004 | Fujii ........................ F16J 9/06 277/434 |
| 6,871,562 B2 | * | 3/2005 | Tropper .................. B62D 5/12 277/579 |
| 6,916,154 B2 | | 7/2005 | Synnott |
| 7,347,662 B2 | | 3/2008 | Balsdon |
| 2013/0051993 A1 | * | 2/2013 | Webb .................... F16J 15/164 415/173.7 |

* cited by examiner

RADIALLY COACTING RING SEAL

CROSS-REFERENCE TO RELATED APPLICATIONS

This application is 35 U.S.C. §371 U.S. National Stage filing of International Patent Application No. PCT/US13/32605 filed on Mar. 15, 2013, claiming priority to U.S. provisional Patent Application No. 61/707,514 filed on Sep. 28, 2012.

BACKGROUND OF THE DISCLOSURE

The present disclosure generally relates to sealing between cylindrical components having large radial and axial displacements Turbine engine seals are subject to relatively high and cyclic temperature conditions, ranging from atmospheric to 1600° F. The cyclic temperature variation results in expansions and contractions of parts, including radial and axial displacements of seals within their seats. Within the turbine engine environment, the temperature variation issue is compounded by a need to effectively seal between parts subject to high pressure differentials.

Within a combustion section of a commercial jet engine, a further sealing challenge as related to mid-turbine vanes is in sealing between surfaces that may not be symmetrically oriented relative to one another. For example, in sealing between a conical and a cylindrical surface, particularly where large radial and axial displacements occur, one current approach has been to use a piston ring for accommodating large axial deflections. However, such a ring may require a relatively thick section to provide fairly tall and robust rails in at least one of the relatively movable components in order to provide a groove for capturing the ring and to provide an axial seal face about a full circumference in view of very high and dynamically undulating axial loads and displacements encountered. Such a thick full-hoop section may be subjected to extremely high stresses under the large thermal gradients common to the internal environment of a gas turbine engine.

SUMMARY OF THE DISCLOSURE

In accordance with one aspect of the disclosure, a ring seal apparatus for high temperature sealing includes a first ring including a pair of radial faces, and a second ring including a second pair of radial faces substantially parallel to the first pair of radial faces, and the second ring is adapted to coact with the first ring. The first and second rings together define a pair of coacting mating faces obliquely angled relative to their radial faces, so that each of the mating faces is adapted to slide at an angle relative to the radial faces to seal an interface of the two rings at an angle relative to the radial faces. The pair of coacting rings is adapted to seal a circumferential gap between a pair of components.

In accordance with another aspect of the disclosure, a ring seal apparatus and axial support structure for high temperature sealing of a circumferential gap between a pair of components includes a first ring including a pair of radial faces, a second ring including a second pair of radial faces substantially parallel to the first pair of radial faces, the second ring adapted to coact with the first ring. The support structure is formed of a pair of axially spaced abutments adapted to axially retain the first and second rings. Together, the first and second rings define a pair of coacting mating faces. The mating faces are obliquely angled relative to the radial faces so that each of the mating faces is adapted to slide at an angle relative to the radial faces. The pair of coacting rings is adapted to seal a circumferential gap between a pair of components and the abutments are fixed to one of the aligned components.

In an additional and/or alternative embodiment of any of the foregoing embodiments, the first and second rings are axially positioned side-by-side so that the coacting mating faces slide relative to each other at an angle to the radial faces of the rings when the ring seal apparatus is subject to thermal expansion and vibration.

In an additional and/or alternative embodiment of any of the foregoing embodiments, the obliquely angled mating faces form a separate sealing interface between the first and second rings, in addition to the seal of the circumferential gap provided by the ring seal apparatus.

In an additional and/or alternative embodiment of any of the foregoing embodiments, the sealing interface between the first and second rings functions as a wedge to enhance radial sealing of the ring seal apparatus.

In an additional and/or alternative embodiment of any of the foregoing embodiments, the radial sealing of the ring seal apparatus is enhanced as a direct function of axial pressure between the coacting mating faces of the first and second rings.

In an additional and/or alternative embodiment of any of the foregoing embodiments, each of the first and second rings is a component sealing surface.

In an additional and/or alternative embodiment of any of the foregoing embodiments, each component sealing surface is defined by a rounded corner.

In an additional and/or alternative embodiment of any of the foregoing embodiments, at least three sealing contacts are established between the ring seal and the component surfaces when the seals are applied to asymmetrically oriented component surfaces.

In accordance with yet another aspect of the disclosure, a method of forming a ring seal apparatus includes providing a first ring having a pair of radial faces; forming a second ring having a second pair of radial faces substantially parallel to the first pair of radial faces, and providing that the second ring is adapted to coact with the first ring. The method further includes forming an obliquely angled face in each of the first and second rings to define a pair of coacting mating faces relative to the radial faces of each ring, such that each of the mating faces is adapted to slide at an angle relative to the radial faces. The method further includes juxtaposing the first and second rings axially side-by-side so that their coacting mating faces are adapted to seal a circumferential gap between asymmetrically aligned components.

In an additional and/or alternative embodiment of any of the foregoing embodiments, a method of forming a ring seal apparatus further includes providing a pair of abutments on one of the components to axially retain the first and second rings.

In an additional and/or alternative embodiment of any of the foregoing embodiments, a method of forming a ring seal apparatus further includes providing the pair of abutments such that they define a peripheral slot adapted to axially retain the rings.

In an additional and/or alternative embodiment of any of the foregoing embodiments, a method of forming a ring seal apparatus further includes forming rounded corners on each ring to define enhanced component sealing surfaces.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. It should be further understood that this disclosure is not limited to the particular embodiments illustrated herein.

DETAILED DESCRIPTION

Figure 1:
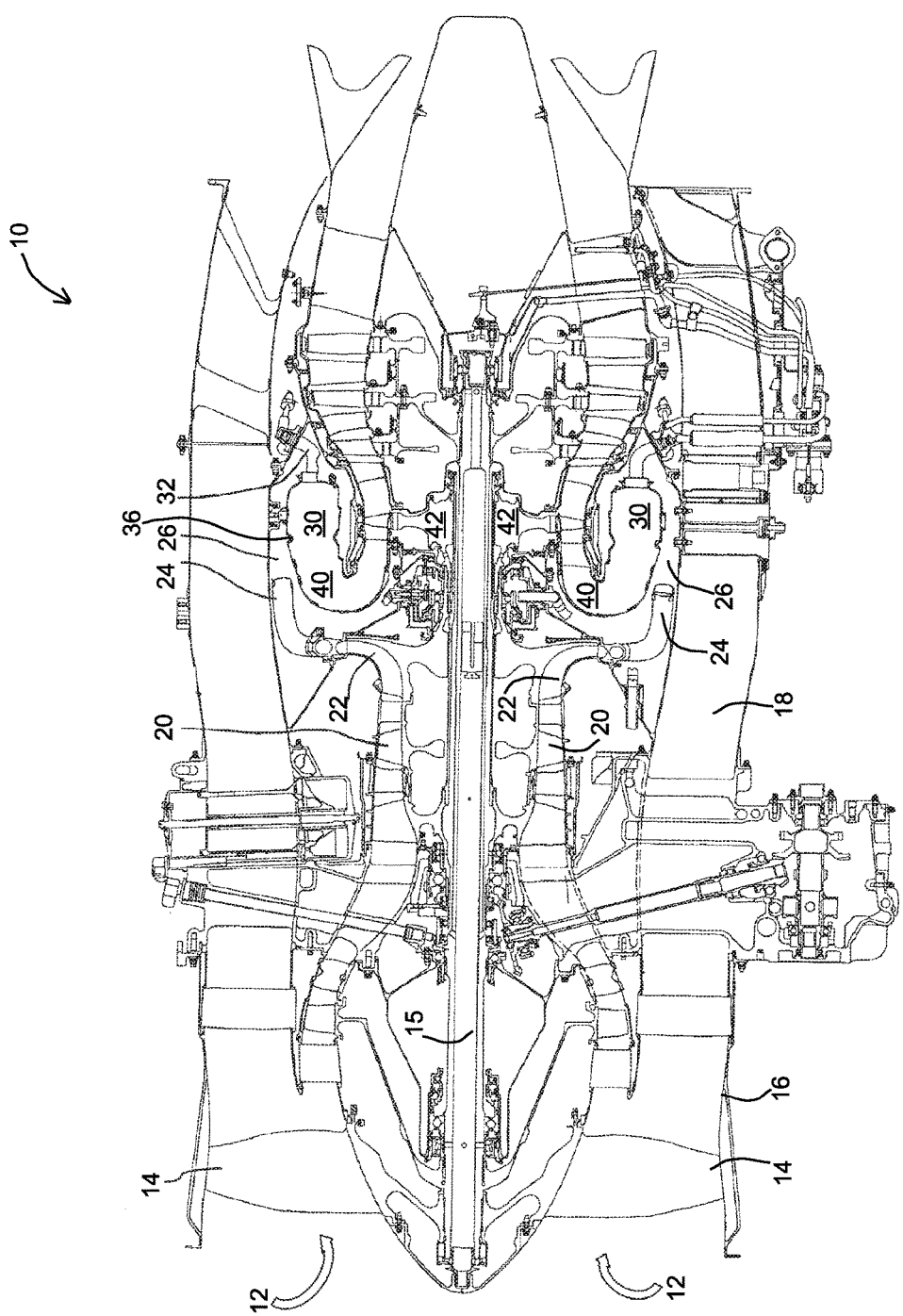
FIG. 1 is a cross-sectional view of a turbofan gas turbine engine.

Referring now to the drawings and with initial reference to FIG. 1, a cross-section of a turbofan gas turbine engine 10 is depicted. Intake air 12 (indicated by arrows) consists of an atmospheric airflow as may be required to support the successful operation of the gas turbine engine 10. The intake air 12 is pulled into the gas turbine engine 10 by fan blades 14, adapted to rotate within a fan case 16 on a multistage turbine shaft 15. The intake air 12 may be split into two paths; a first path may be provided via a bypass duct 18, which longitudinally and circumferentially encases the internal working components of the gas turbine engine 10. The so-called bypass air flowing through the bypass duct 18 may be employed for producing additional thrust in modern turbofan jet engines, and as those skilled in the art may appreciate.

The second air path may be directed to and through an axial flow compressor 20, commonly called a low-pressure stage compressor. From the low-pressure stage compressor 20, the second air path may enter a high-pressure centrifugal compressor 22, where the air may be further compressed and then pushed out through a diffuser 24 into a high-pressure air plenum 26.

A plurality of combustors 30 may surround the multistage turbine shaft 15; the combustors 30 may be situated just radially inwardly of the bypass duct 18. Each of the combustors 30 may be supplied fuel via fuel supply tubes 32. The combustors 30 may be perforated with a plurality of apertures 36 to permit entry of high-pressure air into the combustors 30. Ignition of the fuel takes place in the combustors 30, and the products of combustion in the form of highly expansive gases pass through nozzle guide vanes 40 and then through turbines 42 to develop flight-sustaining thrust.

Figure 2:
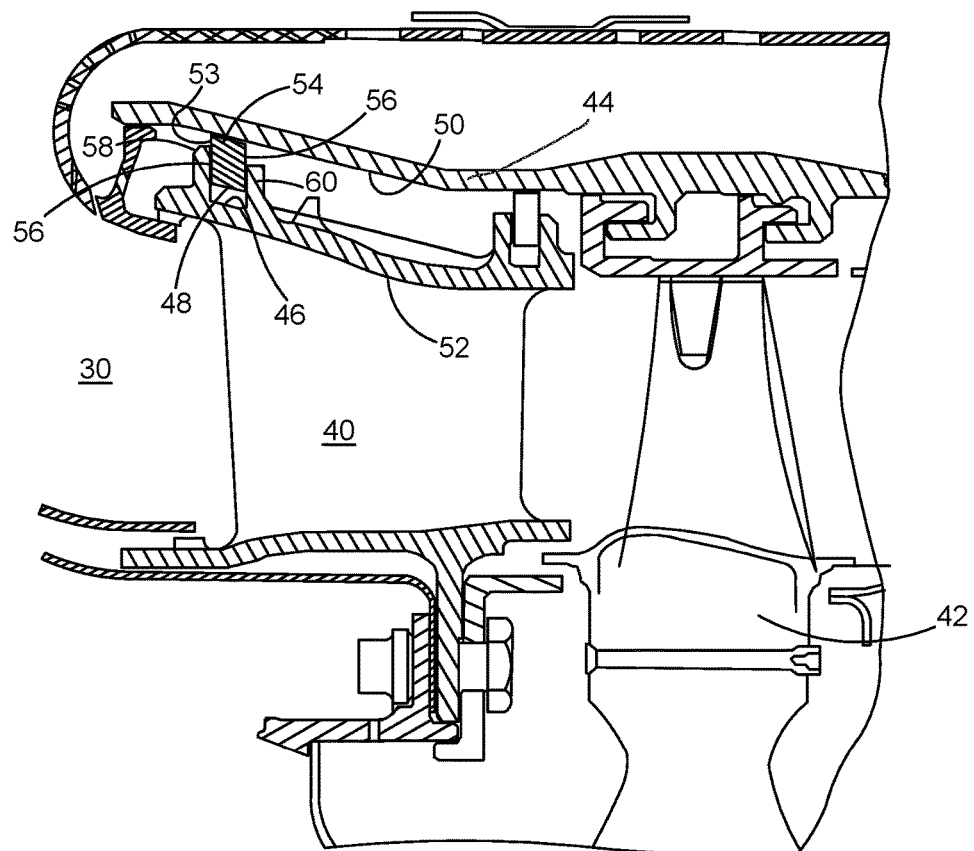
FIG. 2 is a cross-sectional view of a portion of the view of FIG. 1.

Referring now to FIG. 2, within the environment of high-pressure and high temperature gas flows, it may be necessary to seal between a turbine support case housing 44 and an outer shroud 52, as shown. As shown in this prior art depiction, a single piece resilient sealing ring 48 may provide sealing between the inner surface 50 of the case housing 44 and the outer shroud 52. For this purpose, a peripheral groove 46 has been employed for retention of the sealing ring 48.

The single piece resilient sealing ring 48 has an outer extremity 54 which directly engages an inner surface 50 of the case housing 44, as well as radial faces 56 adapted to engage mating faces of a pair of axial retention abutments 58, 60. As will be appreciated, the axial retention abutments 58, 60 form the slot or peripheral groove 46 in which the seal 48 may be axially retained.

Figure 3:
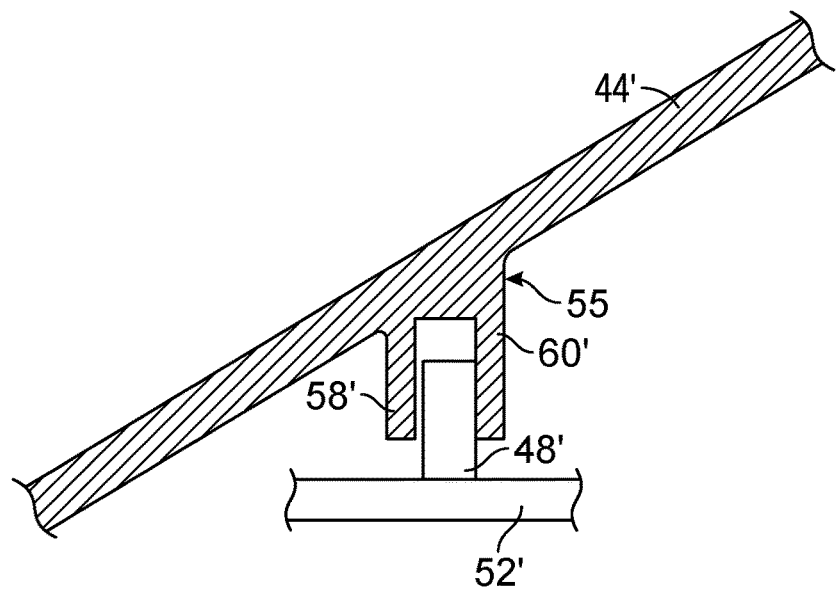
FIG. 3 is a cross-sectional view of a prior art component.

Referring now to FIG. 3, an enlarged view of such a prior art seal is depicted as seal 48' along with its associated mating components, including retention abutments 58' and 60' within which the seal 48' may be adapted to provide sealing between a turbine support case housing 44' and an outer shroud 52', as earlier described. It may be appreciated that any significant vibratory movements of the sealed components 44' and 52' may produce shifting and/or cocking of those components, which may at least occasionally challenge the capability of the seal 48' to effectively maintain a full sealing effect.

Moreover, the overall sealing structure of the prior art seal 48' has required a thickened full hoop region 55, 60 in either of the components 44', 52' (in this case component 44') which may potentially give rise to problems due to the stress prone nature of significant thermal expansions and cyclic pressure fluctuations. Moreover, the full hoop region 55, 60 may be relatively expensive to manufacture.

Figure 4:
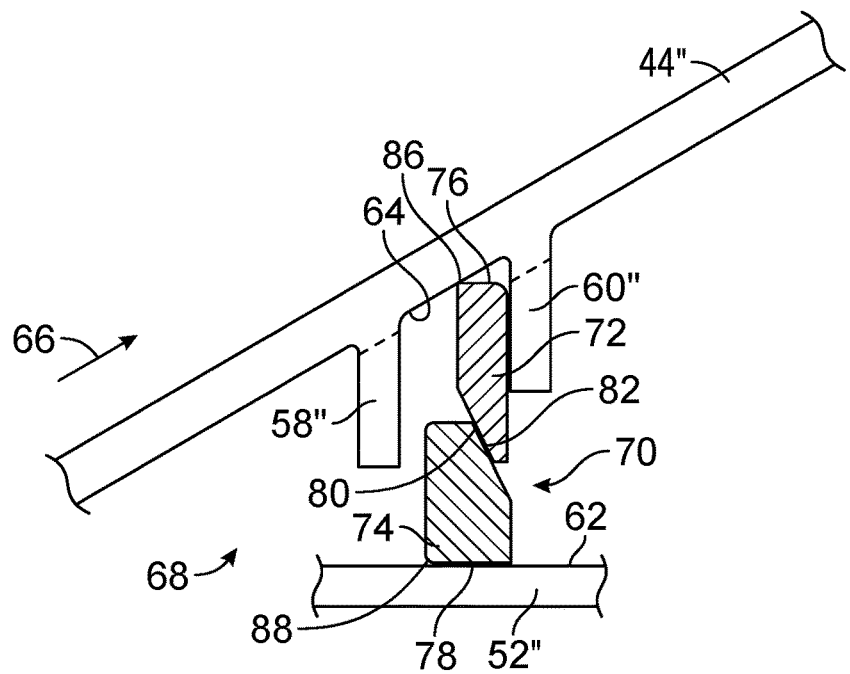
FIG. 4 is a cross-sectional view of the disclosed radially coacting ring seal.

Referring now to FIG. 4, a modified turbine support case housing 44" may be employed to, among other benefits, avoid need for inclusion of the thickened full hoop region 55, 60 of the case housing 44' of FIG. 3. More specifically, a radially coacting sealing ring 70 may incorporate an outer or upper sealing ring portion 72, adapted to coact with a lower or inner sealing ring portion 74. Each of the sealing ring portions 72, 74 may include an oblique sealing face, such as oblique sealing face 80 situated on portion 72, and oblique sealing face 82 situated on portion 74. The oblique sealing faces 80, 82 may be adapted to matingly coact, and to seal more effectively over a wider range of thermal displacements that include relatively wide vertical cyclic separations between the case housing 44" and outer shroud 52".

Region 66 (depicted as an arrow) is part of a high temperature combustion flow path. Region 68 (also depicted as an arrow) is a high-pressure cooler side of the case housing 44". It may be appreciated that the high-pressure region 68 will tend to force the radially coacting sealing ring 70 to the right in the view shown, and that appropriate sizing of the outer diameter 76 of outer ring portion 72 relative to the case housing 44" may be effective to create at least two circumferential sealing contact lines at all times i.e. between the ring portion 72 and between the inner diameter 64 of the case housing 44" and the outer diameter 76 of the sealing ring portion 72. Those skilled in the art will appreciate that a line sealing contact may be more effectively achieved via the rounded corner 86 which defines one edge of the outside diameter 76 of the sealing ring portion 72. Such corner 86 may thus provide an enhanced component sealing surface.

In addition, the inner diameter 78 of the inner or lower sealing ring portion 74 may be sized to sealingly engage the outside diameter 62 of the outer shroud 52". As in the case of the outer diameter of ring portion 72, the inner diameter 78 of the ring portion 74 may also include rounded corners 88 to accommodate cocking and other asymmetric movements of the case housing 44" and outer shroud 52" components relative to one another. Such movements between components may be associated with extreme thermal variations, as well as actual temperature gradients, across the parts/components, as well as other factors including extreme turbulence, for example.

The coacting mating oblique sealing faces 80, 82, combined with a sealing design adapted to more effectively accommodate larger vertical separations between the housing and shroud components 44″ and 52″, in environments of considerable vibration and temperature fluctuations that may result in expansion of parts, including that of the radially coacting sealing ring 70, may promote an inherently better sealing arrangement, particularly since sealing contacts are established between the ring seal and the component surfaces when the seals are applied to asymmetrically oriented component surfaces.

In the disclosed embodiment, the sealing ring 70 may have each of its respective portions 72 and 74 formed of high temperature alloys, such as, but not limited to, Nickel, Inconel, e.g. Inconel 718 and Inconel 750, for example, and/or other metallurgical structures that exhibit great durability and strength at temperatures that may reach or its exceed 1600° F.

INDUSTRIAL APPLICABILITY

From the foregoing, it may be appreciated that the technology disclosed herein has industrial applicability in a variety of settings such as, but not limited to sealing vertical gaps or radial separation spaces between shrouds and case housing environments within a jet engine. However, from the foregoing, it may also be noted that the teachings of this disclosure may find industrial application in any number of different situations, including but not limited to, turbine engines. Such engines may be used, for example, on aircraft for generating thrust, or in land, marine, or aircraft applications for generating power.

The disclosure provides an effective and reliable radially coacting sealing ring structure for a turbine engine that may be used to seal a circumferential space between a turbine support case housing and an outer shroud as described herein. To the extent that each of the seal portions may be adapted to be positioned in relatively axial side-by-side positions with respect to the other for both radial and axial interaction via their obliquely angled mating surfaces, each of the rings may be sized and adapted to more closely engage the respective components to be sealed. As such, one of the ring portions may be adapted to seal radially on its outside diameter more closely with one of the cylindrical and/or conical components, while the other of the ring seals may be adapted to seal radially on its inside diameter more closely with the other component. Finally, to the extent that a high-pressure region may exist on one side of the pair of sealing portions, the obliquely angled mating surfaces of the sealing portions may provide a sealing interface between the rings to function as a wedge for enhancement of radial sealing as a function of axial pressure between the rings seal portions.

While the foregoing detailed description has been provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A ring seal apparatus for high temperature sealing for use with a case housing having an axial retention abutment and an inner diameter, the ring seal apparatus comprising:
  a first ring including a pair of radial faces, a ring portion and an outer diameter, wherein the ring portion and the axial retention abutment are in contact and the outer diameter of the first ring and the inner diameter of the case housing are in circumferential sealing contact;
  a second ring including a second pair of radial faces substantially parallel to the first pair of radial faces, the second ring adapted to coact with the first ring;
  the first and second rings together defining a pair of coacting mating faces, wherein the mating faces are obliquely angled relative to the radial faces, such that each of the coacting mating faces is adapted to seal an interface of the two rings at an angle relative to the radial faces;
  wherein the first ring and the second ring are adapted to seal a circumferential gap between a pair of components.

2. The ring seal apparatus of claim 1, wherein the first and second rings are axially positioned side-by-side, such that the coacting mating faces are adapted to slide with respect to each other at an angle relative to the radial faces of the rings when the ring seal apparatus is subject to thermal expansion and vibration.

3. The ring seal apparatus of claim 1, wherein the obliquely angled mating faces comprise a separate sealing interface between the first and second rings in addition to the seal of the circumferential gap provided by the ring seal apparatus.

4. The ring seal apparatus of claim 1, wherein the sealing interface between the first and second rings is adapted to function as a wedge for enhancement of radial sealing of the ring seal apparatus.

5. The ring seal apparatus of claim 1, wherein radial sealing is enhanced as a direct function of axial pressure between the coacting mating faces of the first and second rings.

6. The ring seal apparatus of claim 1, wherein each of the first and second rings defines a component sealing surface.

7. The ring seal apparatus of claim 6, wherein each component sealing surface is defined by a rounded corner.

8. The ring seal apparatus of claim 1, wherein when the seals are applied to asymmetrically oriented component surfaces, at least three sealing contacts are established between the ring seal and the component surfaces.

9. A ring seal apparatus and axial support structure for high temperature sealing of a circumferential gap between a pair of components for use with a case housing having an axial retention abutment and an inner diameter, the ring seal apparatus comprising:
  a first ring including a pair of radial faces, a ring portion and an outer diameter, wherein the ring portion and the axial retention abutment are in contact and the outer diameter of the first ring and the inner diameter of the case housing are in circumferential sealing contact;
  a second ring including a second pair of radial faces substantially parallel to the first pair of radial faces, the second ring adapted to coact with the first ring;
  the support structure comprising a pair of axially spaced abutments adapted to axially retain the first and second rings;
  the first and second rings together defining a pair of coacting mating faces, wherein the mating faces are obliquely angled relative to the radial faces, such that each of the mating faces is adapted to slide at an angle relative to the radial faces;
  wherein the first ring and the second ring seal the circumferential gap between the components, and wherein the abutments are fixed to one of the aligned components.

10. The ring seal apparatus and axial support structure of claim 9, wherein the first and second rings are axially positioned side-by-side, such that the coacting mating faces are adapted to slide with respect to each other at an angle relative to the radial faces of the rings when the ring seal apparatus is subject to thermal expansion and vibration.

11. The ring seal apparatus and axial support structure of claim 9, wherein the obliquely angled mating faces comprise a separate sealing interface between the first and second rings in addition to the seal of the circumferential gap provided by the ring seal apparatus.

12. The ring seal apparatus and axial support structure of claim 9, wherein the sealing interface between the first and second rings is adapted to function as a wedge for enhancement of radial sealing of the ring seal apparatus.

13. The ring seal apparatus and axial support structure of claim 9, wherein radial sealing is enhanced as a direct function of axial pressure between the coacting mating faces of the first and second rings.

14. The ring seal apparatus and axial support structure of claim 9, wherein each of the first and second rings defines a component sealing surface.

15. The ring seal apparatus and axial support structure of claim 14, wherein each component sealing surface is defined by a rounded corner.

16. The ring seal apparatus and axial support structure of claim 9, wherein when the seals are applied to asymmetrically oriented component surfaces, at least three sealing contacts are established between the ring seal and the component surfaces.

17. A method of sealing a circumferential gap between components with a case housing having an axial retention abutment and an inner diameter, the method comprising:
   forming a ring seal apparatus including a first ring having a pair of radial faces, a ring portion and an outer diameter, wherein the ring portion and the axial retention abutment are in contact and the outer diameter of the first ring and the inner diameter of the case housing are in circumferential sealing contact;
   forming a second ring having a second pair of radial faces substantially parallel to the first pair of radial faces, and providing that the second ring is adapted to coact with the first ring;
   forming an obliquely angled face in each of the first and second rings to define a pair of coacting mating faces relative to the radial faces of each ring, such that each of the mating faces is adapted to slide at an angle relative to the radial faces;
   juxtaposing the first and second rings axially side-by-side so that their coacting mating faces are adapted to seal a circumferential gap between asymmetrically aligned components.

18. The method of claim 17, further comprising providing a pair of abutments on one of the components to axially retain the first and second rings.

19. The method of claim 18, wherein the pair of abutments defines a peripheral slot adapted to axially retain the rings.

20. The method of claim 19, further comprising forming rounded corners on each ring to define enhanced component sealing surfaces.

* * * * *